US010570822B2

(12) United States Patent
Mehta

(10) Patent No.: US 10,570,822 B2
(45) Date of Patent: Feb. 25, 2020

(54) EXHAUST MANIFOLD SYSTEM FOR TURBOCHARGER DEVICE WITH PLURAL VOLUTE MEMBERS

(71) Applicant: HONEYWELL INTERNATIONAL INC., Morris Plains, NJ (US)

(72) Inventor: Darius Mehta, Rancho Palos Verdes, CA (US)

(73) Assignee: GARRETT TRANSPORTATION I INC., Torrance, CA (US)

( * ) Notice: Subject to any disclaimer, the term of this patent is extended or adjusted under 35 U.S.C. 154(b) by 205 days.

(21) Appl. No.: 15/632,611

(22) Filed: Jun. 26, 2017

(65) Prior Publication Data
US 2018/0371992 A1  Dec. 27, 2018

(51) Int. Cl.
| F02C 6/12 | (2006.01) |
| F01N 13/10 | (2010.01) |
| F02B 37/02 | (2006.01) |
| F02C 7/04 | (2006.01) |
| F02B 39/00 | (2006.01) |

(52) U.S. Cl.
CPC ............. *F02C 6/12* (2013.01); *F01N 13/107* (2013.01); *F02B 37/025* (2013.01); *F02C 7/04* (2013.01); *F02B 39/00* (2013.01); *F05D 2220/40* (2013.01)

(58) Field of Classification Search
CPC .. F02C 6/12; F02C 7/04; F01N 13/107; F01N 2240/36; F02B 37/025; F02B 39/00; F02B 37/18; F02D 13/0242; F05D 2220/40
USPC ................. 60/602, 616, 323–324; 123/198 F
See application file for complete search history.

(56) References Cited

U.S. PATENT DOCUMENTS

| 7,509,805 | B2 | 3/2009 | Karlsson | |
| 7,540,151 | B2 * | 6/2009 | Boehm | F01N 13/107 |
| | | | | 60/612 |
| 8,000,878 | B2 | 8/2011 | Massard et al. | |
| 8,991,177 | B2 * | 3/2015 | Rutschmann | F01N 13/107 |
| | | | | 60/612 |
| 2011/0126812 | A1 * | 6/2011 | Miyashita | F01N 13/107 |
| | | | | 123/703 |
| 2013/0111899 | A1 | 5/2013 | Straub | |
| 2015/0204257 | A1 * | 7/2015 | Osumi | F02D 41/0007 |
| | | | | 60/605.1 |

(Continued)

FOREIGN PATENT DOCUMENTS

| DE | 102014200573 A1 | 7/2015 |
| EP | 1400667 A2 | 3/2004 |

(Continued)

OTHER PUBLICATIONS

Extended EP Search Report for Application No. 18171726.5 dated Sep. 28, 2018.

*Primary Examiner* — Thai Ba Trieu
(74) *Attorney, Agent, or Firm* — Lorenz & Kopf, LLP

(57) ABSTRACT

A turbocharger system includes a manifold system that maintains separation between flow paths of different manifold arrangements. One manifold arrangement directs flow from a first group of combustion chambers to a first volute passage of a turbine section of a turbocharger. Another manifold arrangement directs flow from a second group of combustion chambers to a second volute passage of the turbine section of the turbocharger. The system also provides selective variation of the available volume for exhaust flow through the manifold arrangements.

19 Claims, 4 Drawing Sheets

(56) References Cited

U.S. PATENT DOCUMENTS

| | | | |
|---|---|---|---|
| 2016/0032824 A1* | 2/2016 | Fuqua | F01N 13/107 60/612 |
| 2016/0032869 A1* | 2/2016 | Boyer | F01N 13/107 123/568.11 |
| 2016/0215736 A1* | 7/2016 | Millward | F01N 13/107 |
| 2017/0089255 A1* | 3/2017 | Freisinger | F02D 13/0242 |
| 2018/0128160 A1* | 5/2018 | Colliou | F02B 37/025 |
| 2018/0142610 A1* | 5/2018 | Colliou | F02B 37/025 |
| 2018/0149075 A1* | 5/2018 | Baudrand | F02B 37/025 |
| 2018/0171883 A1* | 6/2018 | Ulrey | F01N 13/107 |

FOREIGN PATENT DOCUMENTS

| | | | | |
|---|---|---|---|---|
| EP | 2749757 A1 | | 7/2014 | |
| GB | 2535537 A | * | 8/2016 | F01N 13/107 |
| GB | 2544809 A | * | 5/2017 | F02B 37/10 |
| JP | 2002089377 A | * | 3/2002 | F02D 13/0276 |
| JP | 2013142324 A | * | 7/2013 | F02C 6/12 |
| WO | WO-9960259 A1 | * | 11/1999 | F02D 13/0242 |
| WO | 2015027335 A1 | | 3/2015 | |

\* cited by examiner

EXHAUST MANIFOLD SYSTEM FOR TURBOCHARGER DEVICE WITH PLURAL VOLUTE MEMBERS

TECHNICAL FIELD

The present disclosure generally relates to a turbocharger system and, more particularly, relates to an exhaust manifold system for a turbocharger device with plural volute members.

BACKGROUND

Some engine systems include one or more turbochargers. Typically, turbochargers include a turbine wheel and a compressor wheel mounted on a common shaft and carried within isolated turbine and compressor housings, respectively. The turbine wheel may be driven in rotation by exhaust gas output by the engine. This, in turn, rotates the compressor wheel for compressing air that is fed to the combustion chambers of the engine. Accordingly, the turbocharger may provide a performance boost and increased efficiency to the engine.

Turbocharger systems may operate in a number of conditions. For example, the turbocharger may operate at relatively low engine speeds, relatively high engine speeds, and at speeds therebetween. As such, the turbocharger system may operate at times when the exhaust mass flow is relatively high, low, and therebetween.

Accordingly, it is desirable to provide an improved turbocharger system that boosts engine performance across a wide range of operating conditions. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger system is disclosed that is configured to receive exhaust gas from an engine with a plurality of combustion chambers. The turbocharger system includes a turbine section with a turbine wheel, a first volute member with a first volute passage, and a second volute member with a second volute passage. The first volute passage is configured to direct flow of exhaust gas toward the turbine wheel, and the second volute passage configured to direct flow of exhaust gas toward the turbine wheel. A manifold system is included that is configured to route exhaust gas from the plurality of combustion chambers to the first volute passage and the second volute passage. The manifold system includes a first manifold arrangement and a second manifold arrangement. The first manifold arrangement is configured to receive a first exhaust gas from a first group of the plurality of combustion chambers and direct the first exhaust gas to the first volute member. The second manifold arrangement is configured to receive a second exhaust gas from a second group of the plurality of combustion chambers and direct the second exhaust gas to the second volute member. The first manifold arrangement is fluidly disconnected from the second manifold arrangement. The first manifold arrangement includes a first manifold and a second manifold. The first manifold and the second manifold are fluidly connected to the combustion chambers of the first group and to the first volute member. The first manifold arrangement is configured to operate in a first condition and a second condition of the turbocharger system. In the first condition, the first manifold arrangement is configured to direct flow of the first exhaust gas from the first group to the first volute member via the first manifold. In the second condition, the first manifold arrangement is configured to direct flow of the first exhaust gas from the first group to the first volute member via the first manifold and the second manifold.

In another embodiment, a method of operating a turbocharger system is disclosed that includes determining, by a processor, a characteristic of the turbocharger system. The characteristic is related to the flow of exhaust gas from a plurality of combustion chambers of an engine via a manifold system to a first volute member and a second volute member of a turbine section of a turbocharger. The method also includes selectively controlling, by the processor, a valve between a first position and a second position based on the determined characteristic to change flow through the manifold system. The manifold system includes a first manifold arrangement and a second manifold arrangement. The first manifold arrangement is configured to receive a first exhaust gas from a first group of the plurality of combustion chambers and direct the first exhaust gas to the first volute member. The second manifold arrangement is configured to receive a second exhaust gas from a second group of the plurality of combustion chambers and direct the second exhaust gas to the second volute member. The first manifold arrangement is fluidly disconnected from the second manifold arrangement. The first manifold arrangement includes a first manifold and a second manifold that are fluidly connected to the combustion chambers of the first group and to the first volute member. In the first position of the valve, the first manifold arrangement is configured to direct flow of the first exhaust gas from the first group to the first volute member via the first manifold. In the second position of the valve, the first manifold arrangement is configured to direct flow of the first exhaust gas from the first group to the first volute member via the first manifold and the second manifold.

In a further embodiment, a turbocharger system is disclosed that includes an engine with a plurality of combustion chambers configured to produce an exhaust gas. The turbocharger system also includes a turbocharger with a turbine housing having a first scroll and a second scroll. A manifold system is included that is configured to route the exhaust gas from the plurality of combustion chambers to the first scroll and the second scroll. Moreover, the turbocharger system includes a valve having a first position and a second position. The turbocharger system additionally includes a controller configured to detect an operation characteristic of the engine and selectively change the valve between the first position and the second position based on the detected operation characteristic. The manifold system includes a first manifold arrangement and a second manifold arrangement. The first manifold arrangement is configured to receive a first exhaust gas from a first group of the plurality of combustion chambers and direct the first exhaust gas to the first scroll. The second manifold arrangement is configured to receive a second exhaust gas from a second group of the plurality of combustion chambers and direct the second exhaust gas to the second scroll. The first manifold arrangement is fluidly disconnected from the second manifold arrangement. The first manifold arrangement includes a first manifold and a second manifold. The first manifold and the second manifold fluidly are connected to the combustion chambers of the first group and to the first scroll. When the valve is in the first position, the first manifold arrangement is configured to direct flow of the first exhaust gas from the first group to the first scroll via the first manifold. In addition, when the valve is in the second position, the first manifold arrangement is configured to direct flow of the first exhaust gas from the first group to the first scroll via the first manifold and the second manifold.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
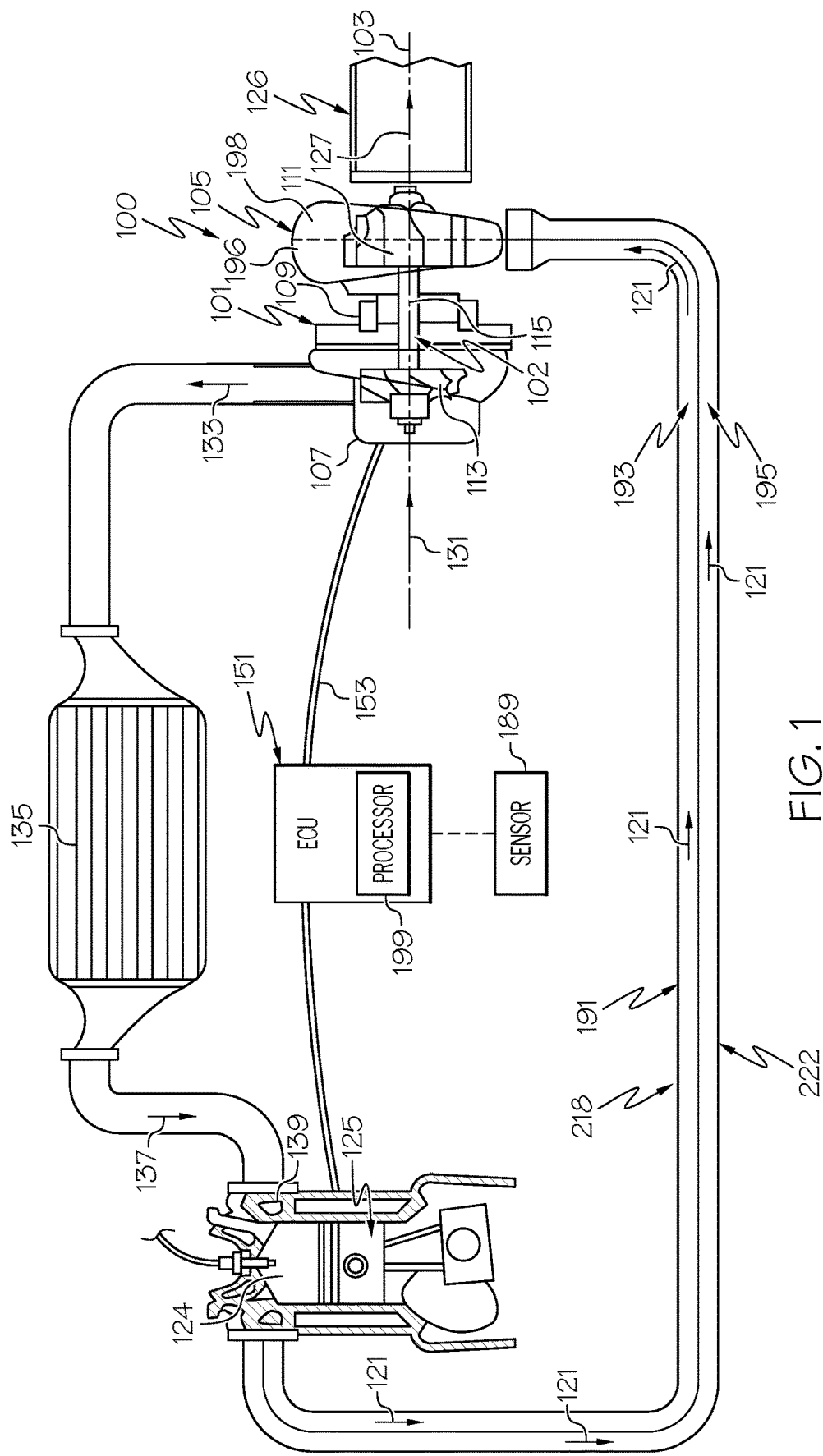
FIG. 1 is a schematic view of a turbocharger and a manifold system configured for directing exhaust flow from an engine to the turbocharger according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbocharger system with improved characteristics. In particular, example embodiments include a turbocharger system with at least two volute members (e.g., scrolls) and an exhaust manifold system configured to direct exhaust gas flow from a plurality of engine combustion chambers to the volute members. In particular, the manifold system may define a first manifold arrangement and a second manifold arrangement. The first manifold arrangement may receive exhaust gas from a first group of the engine combustion chambers and direct the flow to a first volute member. The second manifold arrangement may receive exhaust gas from a second group of the engine combustion chambers and direct the flow to a second volute member. The first manifold arrangement may be fluidly disconnected from the second manifold arrangement.

In some embodiments, the first manifold arrangement may include a first manifold and a second manifold. Under some operating conditions (e.g., at relatively low engine speeds), exhaust may flow via the first manifold from the first group of combustion chambers to the first volute member. In other operating conditions (e.g., at relatively high engine speeds), exhaust may flow via the first and second manifolds from the first group of combustion chambers to the first volute member.

Furthermore, in some embodiments, the second manifold arrangement may include features that are similar to the first manifold arrangement. Accordingly, the second manifold arrangement may include a first manifold and a second manifold. Under some operating conditions, exhaust may flow via the first manifold from the second group of combustion chambers to the second volute member. In other operating conditions, exhaust may flow via the first and second manifolds from the second group of combustion chambers to the second volute member.

Accordingly, the available volume for exhaust gas flow through the first and second manifold arrangements may be selectively changed, for example, based on current operating conditions. In addition, the first manifold arrangement and the second manifold arrangement may remain fluidly disconnected from each other at the different operating conditions. As such, the manifold system of the present disclosure may provide increased efficiency at some operating conditions (e.g., low engine speeds) due to the separate flow paths from the combustion chambers to the respective volute members. Also, the manifold system may allow the available volume for exhaust gas to be selectively increased at other operating conditions (e.g., high engine speeds) to maintain operating efficiency.

Methods of operating the manifold system will also be discussed. In some embodiments, valves may be included for controlling flow through the first and/or second manifold arrangements.

FIG. 1 is a schematic view of an example turbocharger system 100 that includes a turbocharger housing 101 and a rotor 102. The rotor 102 is configured to rotate within the turbocharger housing 101 about an axis 103 (axis of rotor rotation). The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis 103, through the bearing housing 109, to connect the turbine wheel 111 to the compressor wheel 113. Accordingly, the turbine wheel 111 and the compressor wheel 113 may rotate together about the axis 103.

The turbine housing 105 and the turbine wheel 111 cooperate to form a turbine (i.e., turbine section, turbine stage) configured to circumferentially receive a high-pressure and high-temperature exhaust gas stream (collectively referred to with reference number 121) from a plurality of combustion chambers 124 of an internal combustion engine 125. The exhaust gas stream 121 may be delivered via an exhaust manifold system 191. As will be discussed in detail below, the exhaust manifold system 191 may include one or more structures that include two or more exhaust passages, pathways, lines, etc. for routing exhaust gas from the plurality of combustion chambers 124 to the turbine housing 105.

The turbine wheel 111 (and thus the rotor 102) is driven in rotation around the axis 103 by the high-pressure and high-temperature exhaust gas stream 121. The turbine housing 105 may also be connected to a downstream exhaust structure 126 (e.g., one or more downstream exhaust pipes). The turbine housing 105 may release an exhaust gas stream 127 thereto. The exhaust gas stream 127 can be lower-pressure and lower-temperature compared to the exhaust gas stream 121.

Also, in some embodiments, the turbine housing 105 may include one or more structures that define distinct flow passages for exhaust gas delivered by the manifold system 191. As shown schematically in the embodiment of FIG. 1, the turbine housing 105 may include a first member 196 (e.g., a first scroll structure) and a second member 198 (e.g., a second scroll structure). The first and/or second members 196, 198 may define distinct volute passages (i.e., volute flow paths) that spiral about the axis 103 and about the turbine wheel 111. As such, the first and second members 196, 198 may comprise a twin scroll arrangement of the turbine housing 105. It will be appreciated that the first member 196 and the second member 198 may be constructed from two parts that are removably attached. In other embodiments, the first member 196 and the second member 198 may be integrally connected and may define a unitary, one piece structure. Furthermore, it will be appreciated that the turbine housing 105 may include more than two volute passages without departing from the scope of the present disclosure.

The compressor housing 107 and compressor wheel 113 cooperate to form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized air stream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The air stream 133 may be channeled through an air cooler 135 (i.e., an intercooler), such as a convectively cooled charge air cooler. The air cooler 135 may be configured to dissipate heat from the air stream 133, increasing its density. The resulting cooled and pressurized air stream 137 is channeled into an intake manifold 139 of the internal combustion engine 125, or alternatively, into a subsequent-stage, in-series compressor.

The operation of the system may be controlled by an engine control unit (ECU) 151 that connects to the remainder of the system via communication connections 153. The ECU 151 may include a processor 199, which is connected to one or more sensors 189. The sensor 189 may be configured to detect various conditions relating to the turbocharger system 100. In some embodiments, for example, the sensor 189 may detect various conditions related to the operation of the engine 125 (e.g., engine speed, exhaust gas mass flow output, etc.). The sensor 189 may provide signals to the processor 199 that correspond to the detected condition(s). The processor 199 may, in turn, process the signal(s) and generate control signals for controlling elements of the system 100 as will be discussed in detail below. In some embodiments, the processor 199 and/or sensor 189 may rely on a virtual sensor or predetermined model for detecting the operating conditions of the engine 125 and controlling the system 100.

It will be appreciated that the turbocharger system 100 and the valve structure 190 may be arranged and configured differently from the embodiment of FIG. 1 without departing from the scope of the present disclosure. Moreover, it will be appreciated that FIG. 1 schematically illustrates the turbocharger system 100, the manifold system 191, the IC engine 125, and other components. Therefore, these components are not necessarily drawn to scale, connections between parts are shown conceptually, etc.

Figure 2:
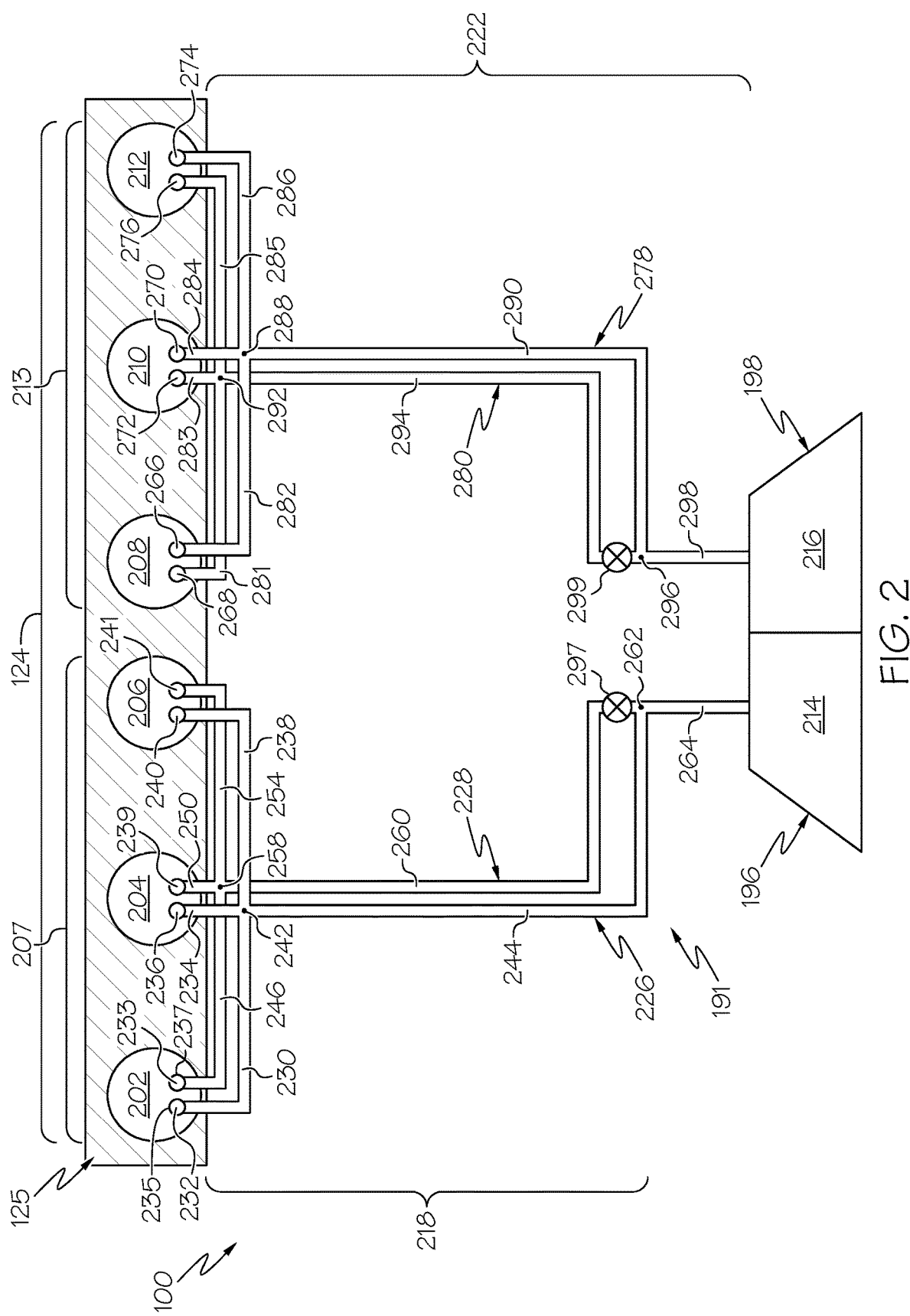
FIG. 2 is a schematic view of the manifold system according to example embodiments of the present disclosure.

Referring now to FIG. 2, additional details are shown. As shown, the engine 125 may include a plurality of combustion chambers 124. There may be any number of combustion chambers 124, and the combustion chambers 124 may have a variety of configurations (e.g., a V-configuration, a straight-configuration, a flat-configuration, etc.) without departing from the scope of the present disclosure.

As shown, the engine 125 may be a six-cylinder engine in some embodiments such that the plurality of combustion chambers 124 includes a first chamber 202, a second chamber 204, a third chamber 206, a fourth chamber 208, a fifth chamber 210, and a sixth chamber 212. The first, second, and third chambers 202, 204, 206 may comprise a first group of chambers 207. The fourth, fifth, and sixth chambers 208, 210, 212 may comprise a second group of chambers 213. In some embodiments, the first group of chambers 207 may be positioned in the engine 125 in an area that is opposite that of the second group of chambers 213. For example, the first group of chambers 207 may be positioned generally in the front of the engine 125 while the second group of chambers 213 may be positioned generally in the rear of the engine 125.

Also, during operation, the combustion chambers 124 may have a predetermined firing order (i.e., sequence of power delivery from each chamber 124). It will be appreciated that the firing order may be achieved by controlled sparking of spark plugs for the respective chambers 124, or in the case of a diesel engine, by controlling the sequence of fuel injection into the chambers 124. In some embodiments, the combustion chambers 124 may have the following sequential firing order: the first chamber 202, the fifth chamber 210, the third chamber 206, the sixth chamber 212, the second chamber 204, and then the fourth chamber 208. However, it will be appreciated that the firing order may be different without departing from the scope of the present disclosure.

Additionally, the first combustion chamber 202 may include a first exhaust port 232 and a second exhaust port 233. Accordingly, in some embodiments, the first combustion chamber 202 may include dual exhaust ports. The first exhaust port 232 and the second exhaust port 233 may be configured for exhausting gas from the first combustion chamber 202 and delivering the exhaust gas to the exhaust manifold system 191.

Flow through the first exhaust port 232 may be controlled by a first engine valve 235. The first engine valve 235 may be a conventional valve that is supported by the engine 125 (e.g., proximate the cylinder head). The first engine valve 235 may move between a CLOSED position and an OPEN position. Also, the position of the first engine valve 235 may be controlled by the ECU 151 in some embodiments. The second exhaust port 233 may also include a second engine valve 237, which may be substantially similar to the first engine valve 235.

Like the first combustion chamber 202, the second combustion chamber 204 may respectively include a first exhaust port 236 and a second exhaust port 239. Also, the third combustion chamber 206 may respectively include a first exhaust port 240 and a second exhaust port 241. Also, like the first exhaust port 232, the first exhaust ports 236, 240 may include respective first engine valves 235. Moreover, like the second exhaust port 233, the second exhaust ports 239, 241 may include respective second engine valves 237.

Similarly, the fourth combustion chamber 208 may include a first exhaust port 266 and a second exhaust port 268. The fifth combustion chamber 210 may include a first exhaust port 270 and a second exhaust port 272. Also, the sixth combustion chamber 212 may include a first exhaust port 274 and a second exhaust port 276. Like the first exhaust port 232 of the first combustion chamber 202, the first exhaust ports 266, 270, 274 may include respective first engine valves 235. Moreover, like the second exhaust port 233 of the first combustion chamber 202, the second exhaust ports 268, 272, 276 may include respective second engine valves 237.

FIG. 2 also shows the turbine housing of the turbocharger system 100. As mentioned above with reference to FIG. 1, the turbine housing 105 may include the first member 196 (e.g., first scroll) and the second member 198 (e.g., second scroll). The first member 196 may define a first volute passage 214, and the second structure 198 may define a second volute passage 216 for the turbocharger system 100.

The manifold system 191 may include a first manifold arrangement 218. The first manifold arrangement 218 may include one or more structures (e.g., pipes, conduits, lines, etc.). The first manifold arrangement 218 may be configured to route exhaust gas from the first group 207 of the combustion chambers 124 to the first member 196 and the first volute passage 214 therein.

The manifold system 191 may also include a second manifold arrangement 222. The second manifold arrangement 222 may include one or more structures (e.g., pipes, conduits, lines, etc.). The second manifold arrangement 222 may be configured to route exhaust gas from the second group 213 of the combustion chambers 124 to the second structure 198 and the second volute passage 216 therein.

As shown in FIG. 2, the first manifold arrangement 218 may be fluidly disconnected from the second manifold arrangement 222. As such, flow from the first group 207 of combustion chambers 124 to the first volute passage 214 may be independent of the flow from the second group 213 of combustion chambers 124 to the second volute passage 216.

The first manifold arrangement 218 may include a number of manifold structures, branches, lines, etc. for fluidly connecting to the combustion chambers 124 of the first group 207 and for fluidly connecting to the first volute passage 214. For example, the first manifold arrangement 218 may include a first manifold 226 and a second manifold 228.

The first manifold 226 may include a first segment 230 that is fluidly connected to the first exhaust port 232 of the first chamber 202, a second segment 234 that is fluidly connected to the first exhaust port 236 of the second chamber 204, and a third segment 238 that is fluidly connected to the first exhaust port 240 of the third chamber 206. The first segment 230, the second segment 234, and the third segment 238 may be joined at a first fluid junction 242. The first manifold 226 may additionally include an intermediate segment 244 that extends away from the first fluid junction 242 and that directs the exhaust gas in a downstream direction therefrom.

The second manifold 228 may include a first segment 246 that is fluidly connected to the second exhaust port 233 of the first chamber 202, a second segment 250 that is fluidly connected to the second exhaust port 239 of the second chamber 204, and a third segment 254 that is fluidly connected to the second exhaust port 241 of the third chamber 206. The first segment 246, the second segment 250, and the third segment 254 may be joined at a second fluid junction 258. The second manifold 228 may additionally include an intermediate segment 260 that extends away from the second fluid junction 258 and that directs the exhaust gas in a downstream direction therefrom.

In some embodiments, the first manifold 226 and the second manifold 228 may be fluidly connected at a third fluid junction 262, which may be disposed upstream of the first volute passage 214. Moreover, the first manifold arrangement 218 may include a common segment 264. The common segment 264 may be fluidly connected to the third fluid junction 262 and the first volute passage 214. It will be appreciated that the third fluid junction 262 and the common segment 264 are optional components and that the first and second manifolds 226, 228 may fluidly connect to the first member 196 independent of each other.

The second manifold arrangement 222 may include a number of manifold structures, branches, lines, etc. for fluidly connecting to the combustion chambers 124 of the second group 213 and for fluidly connecting to the second volute passage 216. For example, the second manifold arrangement 222 may include a first manifold 278 and a second manifold 280.

The first manifold 278 may include a first segment 282 that is fluidly connected to the first exhaust port 266 of the fourth chamber 208, a second segment 284 that is fluidly connected to the first exhaust port 270 of the fifth chamber 210, and a third segment 286 that is fluidly connected to the first exhaust port 274 of the sixth chamber 212. The first segment 282, the second segment 284, and the third segment 286 may be joined at a fourth fluid junction 288. The first manifold 278 may additionally include an intermediate segment 290 that extends away from the fourth fluid junction 288 and that directs the exhaust gas in a downstream direction therefrom.

The second manifold 280 may include a first segment 281 that is fluidly connected to the second exhaust port 268 of the fourth chamber 208, a second segment 283 that is fluidly connected to the second exhaust port 272 of the fifth chamber 210, and a third segment 285 that is fluidly connected to the second exhaust port 276 of the sixth chamber 212. The first segment 281, the second segment 283, and the third segment 285 may be joined at a fifth fluid junction 292. The second manifold 280 may additionally include an intermediate segment 294 that extends away from the fifth fluid junction 292 and that directs the exhaust gas in a downstream direction therefrom.

In some embodiments, the first manifold 278 and the second manifold 280 may be fluidly connected at a sixth fluid junction 296, which may be disposed upstream of the second volute passage 216. Moreover, the first manifold arrangement 218 may include a common segment 298. The common segment 298 may be fluidly connected to the sixth fluid junction 296 and the second volute passage 216. It will be appreciated that the sixth fluid junction 296 and the common segment 298 are optional components and that the first and second manifolds 278, 280 may fluidly connect to the second member 198 independent of each other.

Furthermore, the manifold system 191 may include one or more valves. For example, a first valve 297 (i.e., first backflow valve) may be included. The first valve 297 may be operably supported, for example, on the intermediate segment 260 of the second manifold 228 of the first manifold arrangement 218. Also, a second valve 299 (i.e., second backflow valve) may be included. The second valve 299 may be operably supported, for example, on the intermediate segment 294 of the second manifold 280 of the second manifold arrangement 222.

The first valve 297 and/or the second valve 299 may be one-way valves that are moveable between an open position and a closed position. With the first valve 297 in the open position, exhaust gas may flow in the downstream direction through the second manifold 228. Also, with the first valve 297 in the closed position, exhaust gas may be inhibited from flowing through the second manifold 228 in the upstream direction (i.e., from the common segment 264 toward the engine 125). Similarly, with the second valve 299 in the open position, exhaust gas may flow in the downstream direction through the second manifold 280. Also, with the second valve 299 in the closed position, exhaust gas may be inhibited from flowing through the second manifold 280 in the upstream direction (i.e., from the common segment 298 toward the engine 125).

In some embodiments, the first valve 297 and/or the second valves 299 may be passive valves, such as a one-way reed valve. The first valve 297 and/or second valve 299 may also operate in a coordinated fashion with the second engine valves 237 of the second exhaust ports 233, 239, 241, 268, 272, 276. Generally, in some embodiments, the second engine valves 237 may be actively controlled (e.g., by the ECU 151) according to one or more variable conditions of the engine 125 to regulate exhaust flow through the second manifolds 228, 280. Accordingly, in some conditions, the ECU 151 may control the second valves 237 to open during the exhaust cycles of the combustion chambers 124 so that exhaust gas flows into the second manifolds 228, 280. Pressure from these exhaust streams may passively open the first and second valves 297, 299 for flow toward the first and second volute passages 214, 216. In other conditions, the ECU 151 may control the second valves 237 to remain closed during the exhaust cycles of the combustion chambers 124 so that exhaust is prevented from flowing downstream along the second manifolds 228, 280; additionally, the first and second valves 297, 299 may passively remain closed due to the higher pressure downstream (e.g., in the common segments 264, 298), thereby preventing backflow into the second manifolds 228, 280.

It will be appreciated that the first valve 297 and/or second valve 299 may be configured differently without departing from the scope of the present disclosure. For example, the first and second valves 297, 299 may be active valves (e.g., rotary valves) with an associated actuator that may be controlled by the ECU 151. In addition, it will be appreciated that the first and second valves 297, 299 are optional and may be omitted without departing from the scope of the present disclosure.

Figure 3:
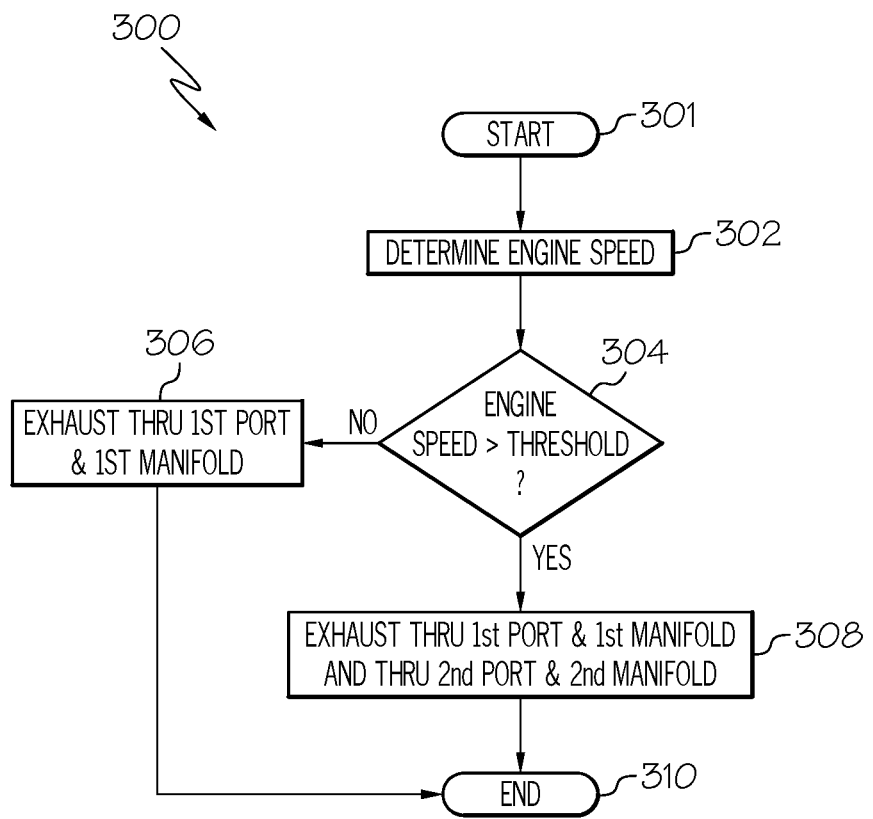
FIG. 3 is a flowchart of a method of operating the system of the present application.

Referring now to FIG. 3, a method 300 of operating the turbocharger system 100 will now be discussed. The method steps, processes, and operations described herein are not to be construed as necessarily requiring their performance in the particular order discussed or illustrated, unless specifically identified as an order of performance. It is also to be understood that additional or alternative steps may be employed. The method 300 may begin at 301 (e.g., upon engine startup).

Then, at 302, the sensor 189 may detect a characteristic, such as the speed of the engine 125, the exhaust mass flow or other characteristic related to exhaust flow from the engine 125. The sensor 189 may send an associated signal to the processor 199. The processor 199 may process the signal and, at 304, the processor 199 may determine whether the detected current engine speed is greater than a predetermined threshold (e.g., threshold engine speed X). The threshold speed X may have any suitable value and may be stored, for example, in a data storage device.

If the detected engine speed is less than the threshold speed X (i.e., 304 answered negatively), the method may continue at 306. At 306, the processor 199 may generate and send control signals to the engine 125 such that the first engine valves 235 open during the respective exhaust cycle of the combustion chambers 124. At 306, control signals may also cause the second engine valves 237 to remain in the closed position. Accordingly, exhaust from the first group 207 of the combustion chambers 124 may flow to the first volute passage 214 via the first manifold 226. There may be substantially no exhaust flow through the second manifold 228 because the second engine valves 237 remain closed, and the first valve 297 may remain closed to prevent backflow through the second manifold 228. Likewise, exhaust from the second group 213 of the combustion chambers 124 may flow to the second volute passage 216 via the first manifold 278, and there may be substantially no exhaust flow through the second manifold 280.

If, however, the detected engine speed is higher than the threshold speed X (i.e., 304 answered affirmatively), the method may continue at 308. At 308, the processor 199 may generate and send control signals to the engine 125 such that the first engine valves 235 and the second engine valves 237 open during the respective exhaust cycle of the combustion chambers 124. Accordingly, exhaust from the first group 207 of the combustion chambers 124 may flow to the first volute passage 214 via the first manifold 226 and the second manifold 228. Likewise, exhaust from the second group 213 of the combustion chambers 124 may flow to the second volute passage 216 via the first manifold 278 and the second manifold 280.

The method 300 may end at 310 (e.g., when the engine is turned off). It will be appreciated that the method 300 may repeat continuously until the engine is turned off. Thus, the engine speed may be continuously and repeatedly sensed, and operation of the turbocharger system 100 and the manifold system 191 may be operated accordingly.

Figure 4:
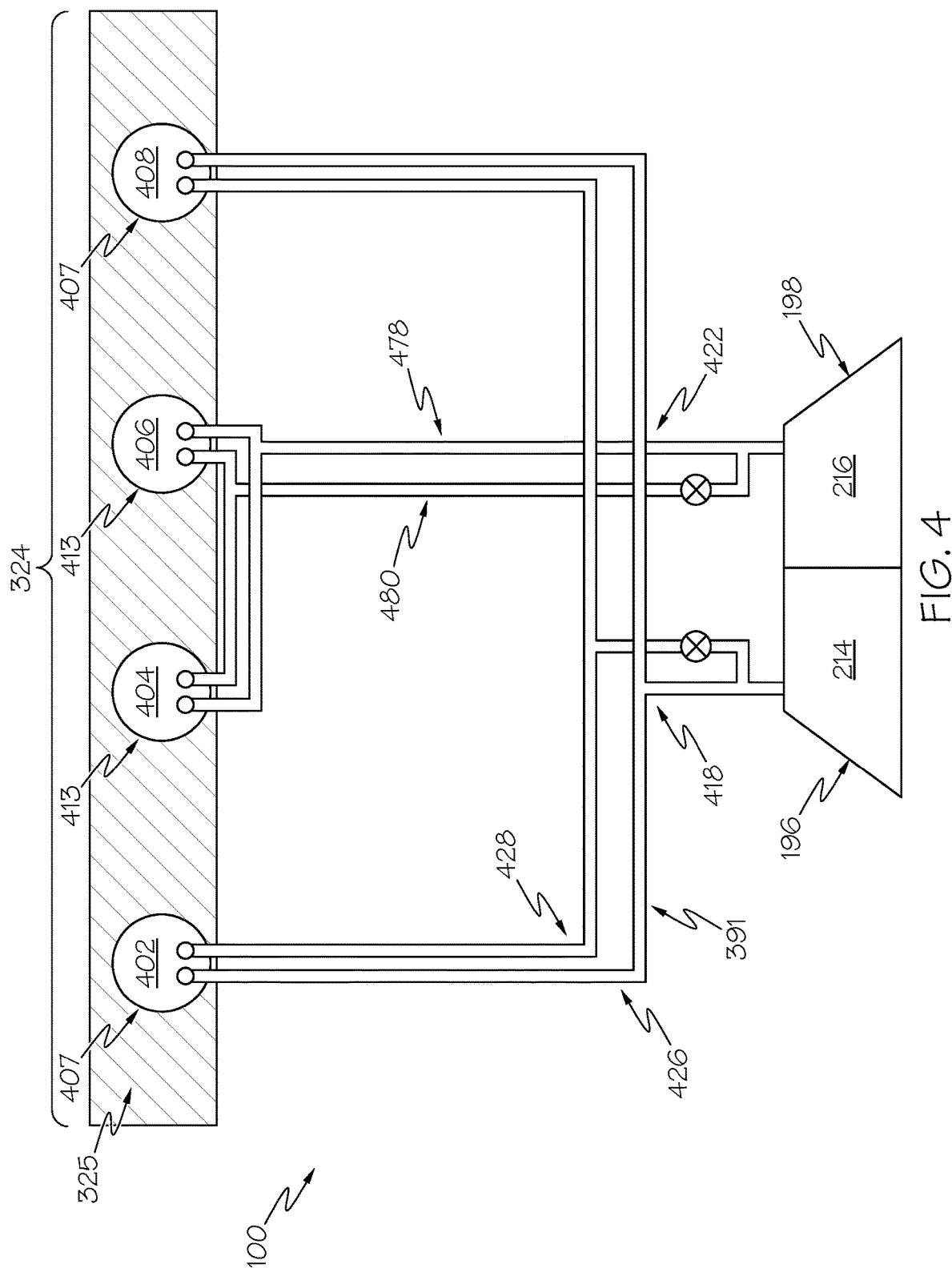
FIG. 4 is a schematic view of the manifold system according to additional example embodiments of the present disclosure.

Referring now to FIG. 4, the turbocharger system 100 is illustrated according to additional embodiments. The turbocharger system 100 may be substantially similar to the embodiments of FIG. 2 except as noted. Components that correspond to those of FIG. 2 are indicated with corresponding reference numbers increased by 200.

As shown, the engine 325 may include a first chamber 402, a second chamber 404, a third chamber 406, and a fourth chamber 408. Accordingly, the engine 325 may be a four-cylinder engine. In some embodiments, the first and second chambers 402, 404 may be positioned in the engine 325 in an area that is opposite that of the third and fourth chambers 406, 408. For example, the first and second chambers 402, 404 may be positioned generally in the front of the engine 325 while the third and fourth chambers 406, 408 may be positioned generally in the rear of the engine 325. In some embodiments, the firing order of the combustion chambers 324 may have the following sequence: first chamber 402, third chamber 406, fourth chamber 408, and then second chamber 404.

The manifold system 391 may include a first manifold arrangement 418 and a second manifold arrangement 422. The first manifold arrangement 418 may include the first manifold 426 and the second manifold 428, and the second manifold arrangement 422 may include the first manifold 478 and the second manifold 480. These components may be substantially similar to the embodiments discussed above, except the connections to the combustion chambers 324 may be different.

The first manifold arrangement 418 may fluidly connect the first group 407 of combustion chambers 324 to the first volute passage 214. The second manifold arrangement 422 may fluidly connect the second group 413 of combustion chambers 324 to the second volute passage 216. In the embodiment shown, the first group 407 may include the first chamber 402 and the fourth chamber 408, and the second group 413 may include the second chamber 404 and the third chamber 406. As such, the first manifold arrangement 418 may be fluidly connected to combustion chambers 324 with nonconsecutive firing orders. Likewise, the second manifold arrangement 422 may be fluidly connected to combustion chambers 324 with nonconsecutive firing orders.

The turbocharger system 100 of FIG. 4 may operate as discussed above. For example, in some embodiments, the turbocharger system 100 of FIG. 4 may operate according to the method 300 of FIG. 3 and described above.

In summary, the turbocharger system 100 and method 300 of the present application provide efficient and effective operations. The system 100 may maintain separation between the flow paths from the engine 125, 325 to the volute passages 214, 216. The available volume for exhaust flow may be relatively low because the first manifolds 226, 278, 426, 478 may provide open flow paths while the second manifolds 228, 280, 428, 480 are closed off. This may provide improved efficiency, for example, at relatively low engine speeds. However, when necessary, the available volume for exhaust gas flow may be selectively increased such that the first manifolds 226, 278, 426, 478 and the second manifolds 228, 280, 428, 480 cooperate to provide open flow paths. Accordingly, there is unlikely to be backpressure that would impede flow to the volute passages 214, 216.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the air quality control system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A method of operating a turbocharged internal combustion engine system including:
   a controller having a processor, a sensor, an engine with a plurality of combustion chambers and a plurality of exhaust valves, a turbocharger having a turbine with a first volute member and a second volute member, and a manifold system to direct an exhaust gas flow from the plurality of combustion chambers to the first volute member and the second volute member of the turbocharger;
       wherein the manifold system includes a first manifold arrangement and a second manifold arrangement;
       wherein the second manifold arrangement is fluidly disconnected from the first manifold arrangement;
       wherein the first manifold arrangement includes a first manifold and a second manifold connecting a first group of the plurality of combustion chambers to the first volute member;
       wherein the second manifold arrangement includes a first manifold and a second manifold connecting a second group of the plurality of combustion chambers and the second volute member;
       wherein the first manifold arrangement further includes a first valve that selectively regulates flow through the second manifold of the first manifold arrangement by moving between a closed position and an open position; and
       wherein the second manifold arrangement further includes a second valve that selectively regulates flow through the second manifold of the second manifold arrangement by moving between a closed position and an open position;
   the method comprising:
       sensing, by the sensor, an actual operating condition of the turbocharged internal combustion engine system, the actual operating condition related to the exhaust gas flow from the plurality of combustion chambers;
       selectively controlling, by the processor of the controller, the first valve and the second valve for movement between the respective closed position and the respective open position based on the actual operating condition to change flow through the manifold system;
       when the first valve and the second valve are in the closed position:
           providing the exhaust gas flow via the first manifold of the first manifold arrangement from the first group to the first volute member and via the first manifold of the second manifold arrangement from the second group to the second volute member; and
           shutting-off the exhaust gas flow from the second manifold of the first manifold arrangement to the first volute member and from the second manifold of the second manifold arrangement to the second volute member; and when the first valve and the second valve are in the open position:
providing the exhaust gas flow via the first manifold and the second manifold of the first manifold arrangement from the first group to the first volute member; and
providing the exhaust gas flow via the first manifold and the second manifold of the second manifold arrangement from the second group to the second volute member.

2. The method of claim 1, wherein sensing the actual operating condition includes sensing an actual engine speed.

3. The method of claim 2, further comprising via the processor of the controller,
selectively controlling movement of the first valve and the second valve based on comparing of the actual engine speed to a threshold engine speed.

4. The method of claim 1, further comprising operating the first group of the plurality of combustion chambers in a nonconsecutive firing order.

5. The method of claim 1, wherein the first valve is one of the plurality of engine exhaust valves of one of the first group of the plurality of combustion chambers.

6. A turbocharged internal combustion engine system that operates in a first operating condition and a second operating condition, the system comprising:
an engine having a plurality of combustion chambers and a plurality of engine exhaust valves, the first operating condition associated with a lower speed of the engine than that of the second operating condition;
a turbocharger having a turbine section with a turbine wheel, a first volute member with a first volute passage, and a second volute member with a second volute passage, the first volute passage configured to direct an exhaust gas flow toward the turbine wheel, the second volute passage configured to direct the exhaust gas flow toward the turbine wheel; and
a manifold system including a first manifold arrangement and a second manifold arrangement;
wherein the first manifold arrangement fluidly connects a first group of the plurality of combustion chambers and the first volute member;
wherein the second manifold arrangement fluidly connects a second group of the plurality of combustion chambers and the second volute member;
wherein the first manifold arrangement is fluidly disconnected from the second manifold arrangement;
wherein the first manifold arrangement further includes a first manifold, a second manifold, and a first valve, the first and second manifolds of the first manifold arrangement being fluidly connected to the plurality of combustion chambers of the first group and to the first volute member, the first valve being controlled by a controller for regulating the exhaust gas flow through the first manifold arrangement;
wherein the second manifold arrangement further includes a first manifold, a second manifold, and a second valve, the first and second manifolds of the second manifold arrangement being fluidly connected to the plurality of combustion chambers of the second group and to the second volute member, the second valve being controlled by the controller for regulating the exhaust gas flow through the second manifold arrangement;

wherein, in the first operating condition, the exhaust gas flow is provided via the first manifold of the first manifold arrangement from the first group to the first volute member, and via the first manifold of the second manifold arrangement from the second group to the second volute member;
wherein, in the first operating condition, the exhaust gas flow via the second manifold of the first manifold arrangement and the second manifold of the second manifold arrangement is shut-off; and
wherein, in the second operating condition, the exhaust gas flow is provided via the first manifold and the second manifold of the first manifold arrangement from the first group to the first volute member, and via the first manifold and the second manifold of the second manifold arrangement from second group to the second volute member.

7. The system of claim 6, wherein the plurality of combustion chambers in the first group operates in a nonconsecutive firing order.

8. The system of claim 6,
wherein the first valve is connected to the second manifold of the first manifold arrangement, and wherein the first valve moves as the system changes between the first operating condition and the second operating condition; and
wherein the second valve is connected to the second manifold of the second manifold arrangement, and wherein the second valve moves as the system changes between the first operating condition and the second operating condition.

9. The system of claim 8, wherein the first valve and the second valve are moveable, respectively, between an open position and a closed position; and
wherein the first valve and the second valve, in the first operating condition, are in the closed position; and
wherein the first valve and the second valve, in the second operating condition, are in the open position.

10. The system of claim 8, wherein the first valve is a backflow valve operably coupled to the second manifold of the first manifold arrangement and wherein, in the first operating condition, the first valve inhibits backflow in an upstream direction extending generally from the first volute member to the engine; and
wherein the second valve is a backflow valve operably coupled to the second manifold of the second manifold arrangement and, in the first operating condition, the second valve inhibits backflow in an upstream direction extending generally from the second volute member to the engine.

11. The system of claim 10, wherein the at least one of the first valve and the second valve is a passive valve.

12. The system of claim 6, further comprising a sensor;
wherein the sensor is configured to detect operating conditions;
wherein the a signal from the sensor being associated with the sensor detecting the operating conditions is processed via a processor of the controller; and
wherein the processor is configured to generate a control signal for controlling the plurality of engine exhaust valves based, at least in part, on the signal from the sensor.

13. The system of claim 7, wherein the first valve is one of the plurality of engine exhaust valves.

14. The system of claim 6, wherein the engine has a total of six combustion chambers.

15. The system of claim 6, wherein the engine has a total of four combustion chambers.

16. The system of claim 6, wherein the first manifold and the second manifold of the first manifold arrangement are fluidly connected at a junction; and
   wherein the junction is disposed upstream of the first volute member.

17. The system of claim 6, wherein the turbine section includes a turbine housing with a twin scroll arrangement;
   wherein the first volute member includes a first scroll of the turbine housing; and
   wherein the second volute member includes a second scroll of the turbine housing.

18. A turbocharged internal combustion engine system comprising:
   an engine including a plurality of combustion chambers to produce an exhaust gas flow via a plurality of engine exhaust valves;
   a turbocharger having a turbine housing including a first scroll and a second scroll;
   a manifold system including a first manifold arrangement and a second manifold arrangement;
      wherein the first manifold arrangement fluidly connects a first group of the plurality of combustion chambers to the first scroll;
      wherein the second manifold arrangement fluidly connects a second group of the plurality of combustion chambers to the second scroll; and
      wherein the first manifold arrangement is fluidly disconnected from the second manifold arrangement;
   a first valve being selectively movable between a first position and a second position to regulate the exhaust gas flow through the second manifold of the first manifold arrangement;
   a second valve being selectively movable between a first position and a second position to regulate the exhaust gas flow through the second manifold of the second manifold arrangement;
   a sensor detecting a first actual operating condition of the engine and, alternatively, a second actual operating condition of the engine, the first actual operating condition associated with a lower speed of the engine than that of the second actual operating condition; and
   a controller selectively regulating the first valve and the second valve respectively between the first position and the second position based on whether the sensor detects the first actual operating condition or the second actual operating condition;
      wherein, the controller adjusts the first valve and the second valve to the first position as a result of the sensor detecting the first actual operating condition to provide the exhaust gas flow via the first manifold of the first manifold arrangement from the first group to the first scroll and via the first manifold of the second manifold arrangement from the second group to the second scroll, and to shut-off the exhaust gas flow through the second manifold of the first manifold arrangement and the second manifold of the second manifold arrangement; and
      wherein, the controller adjusts the first valve and the second valve to the second position as a result of the sensor detecting the second actual operating condition to have the exhaust gas flow through the first manifold and the second manifold of the first manifold arrangement from the first group to the first scroll and through the first manifold and the second manifold of the second manifold arrangement from the second group to the second scroll.

19. The turbocharged internal combustion engine system of claim 18, wherein the first valve is one of the plurality of engine exhaust valve of one of the plurality of combustion chambers of the first group.

* * * * *